(12) United States Patent
Okin

(10) Patent No.: US 7,043,585 B2
(45) Date of Patent: May 9, 2006

(54) FLEXIBLE SYSTEM ARCHITECTURE WITH COMMON INTERFACE FOR MULTIPLE SYSTEM FUNCTIONS

(75) Inventor: Kenneth Okin, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 454 days.

(21) Appl. No.: 10/099,378

(22) Filed: Mar. 13, 2002

(65) Prior Publication Data

US 2003/0188067 A1    Oct. 2, 2003

(51) Int. Cl.
G06F 13/00    (2006.01)
G06F 13/38    (2006.01)

(52) U.S. Cl. ......................................... 710/301; 710/62
(58) Field of Classification Search ........ 710/300–304, 710/8, 10, 11, 104, 105, 62
See application file for complete search history.

(56) References Cited

U.S. PATENT DOCUMENTS

| | | | |
|---|---|---|---|
| 4,692,839 A | | 9/1987 | Lee et al. |
| 4,933,845 A | | 6/1990 | Hayes |
| 5,130,768 A | | 7/1992 | Wu et al. |
| 5,410,717 A | * | 4/1995 | Floro ........................ 710/104 |
| 5,625,802 A | * | 4/1997 | Cho et al. ...................... 703/27 |
| 6,046,912 A | * | 4/2000 | Leman ........................ 361/784 |
| 6,128,685 A | * | 10/2000 | Cronin ........................ 710/301 |
| 6,182,204 B1 | * | 1/2001 | Nakashima ................... 712/38 |
| 6,209,050 B1 | * | 3/2001 | Iho et al. ..................... 710/301 |
| 6,381,693 B1 | * | 4/2002 | Fish et al. ....................... 713/1 |
| 6,389,486 B1 | * | 5/2002 | Petty ............................ 710/8 |
| 6,421,755 B1 | * | 7/2002 | Rao ........................... 710/302 |
| 6,516,373 B1 | * | 2/2003 | Talbot et al. ............... 710/301 |
| 6,725,291 B1 | * | 4/2004 | Lai et al. ...................... 710/16 |
| 6,807,597 B1 | * | 10/2004 | Oh et al. ..................... 710/301 |
| 6,813,668 B1 | * | 11/2004 | Tseng et al. ................ 710/301 |
| 2002/0078290 A1 | * | 6/2002 | Derrico et al. .............. 710/302 |
| 2002/0166020 A1 | * | 11/2002 | Irving et al. ................ 710/301 |
| 2003/0177425 A1 | | 9/2003 | Okin |

* cited by examiner

*Primary Examiner*—Rehana Perveen
*Assistant Examiner*—Trisha Vu
(74) *Attorney, Agent, or Firm*—Meyertons Hood Kivlin Kowert & Goetzel, P.C.; B. Noël Kivlin

(57) ABSTRACT

An apparatus and method are disclosed that define a new, uniform I/O (input/output) interface architecture between the processor module and the motherboard of a computer system, and between the motherboard and expansion boards, via uniform connectors designed to work with the new architecture, such that many different pin-outs are available to the processor module, the interface being dynamically configurable by component control logic of the processor module. Positioning of supplemental connectors (e.g. for I/O or communications) on edges of the cards defines an unimpeded airflow path allowing for efficient cooling of the system.

10 Claims, 4 Drawing Sheets

FLEXIBLE SYSTEM ARCHITECTURE WITH COMMON INTERFACE FOR MULTIPLE SYSTEM FUNCTIONS

BACKGROUND OF THE INVENTION

This invention relates to a system architecture presenting a uniform interface for various data transfer functions of the system. In particular, it relates to a new processor and system architecture wherein a common I/O interface is presented for multiple processor and system functions provided by expansion boards connected to the system.

In conventional systems, different types of connectors are generally included on the system motherboard, to receive add-on cards or boards ("expansion boards") with various types of functionality. Such expansion boards may include memory modules, I/O modules, modules carrying additional processors of various types (including coprocessors such as math coprocessors and graphics processors), network controller modules and interconnects, disk controllers, crossbar extenders, and so on.

The functional module add-on capability for a given system is generally determined in advance by the system architect. For instance, it is typical for a system to have a certain memory expansion capability, and to that end a specific number of dedicated memory expansion slots that receive memory modules are formed on the motherboard. Typically, also, a system has a set amount of processor capability (e.g. it may be designed to handle up to a maximum of four processors), with the processor slots or connections on the motherboard also predetermined. The same is true for input/output capability: the I/O capacity of the system is determined in advance, and the appropriate connections are provided for that amount and type of I/O.

There are inherent inefficiencies in the current approach to system design. For instance, while a system will generally have the capability of expanding its memory to a predetermined number of megabytes or gigabytes, a given user may have need for far less than the maximum, which wastes any excess. The user has, however, paid for the excess capacity, which makes it uneconomical, and in addition motherboard surface area is wasted, which could have been used for some other function. The same inefficiencies can be observed for I/O capacity, multiprocessor expansion capacity, multiple network connections, etc.

Thus, there is a trade-off required today for providing a great amount of a given type of capability. For instance, if multiple types of network connections are to be provided—Ethernet ports, multiple USB connections, parallel ports, serial ports, and so on—then this limits the amount of space on the motherboard for such capabilities as additional PCI slots, memory module slots, coprocessor slots, etc.

It would therefore be advantageous to provide a system architecture that can be better customized to an individual user's needs, without wasting board or chip area and their associated costs on types or amounts of capacity that will go unused, and at the same time minimizing the trade-off currently experienced between providing different types of expansion capability for the system.

Another problem presented by conventional systems is that the connectors for expansion boards to couple to components off the motherboard are not uniform, and in particular are often disposed on an edge of the card at right angles to the connector edge which is plugged into the motherboard. This presents difficulties for both cabling and ventilation of the system. It would be helpful to not only make the connector arrangement uniform, but to do so in such a way that cabling is facilitated and ventilation flow-through is improved.

SUMMARY OF THE INVENTION

A system architecture to according to the invention includes expansion slots with a single, uniform connector design and a standardized physical interface. The processor module includes connectors to each of a plurality of expansion slots, with the connections being the same to each slot. The processor module also includes logic that identifies each type of expansion module that is coupled to the system, and dynamically adapts its I/O control accordingly.

Using such a design, expansion slots can be provided on a motherboard without the system architect needing to decide in advance how to balance the limited area available against the likely configurations that the system's users may need.

Also in accordance with the invention, an expansion board design is presented that uses the standardized interface, and includes a connector along one edge that plugs into the standard slot, while an opposite edge includes the connector(s) to connect the expansion board to other devices separate from the motherboard into which it is plugged. This arrangement not only allows for ease of connector assembly, but the physical configuration also results in greatly increased airflow from the fans in the system, and thus improved cooling over prior systems.

DESCRIPTION OF THE PREFERRED EMBODIMENTS

Figure 1:
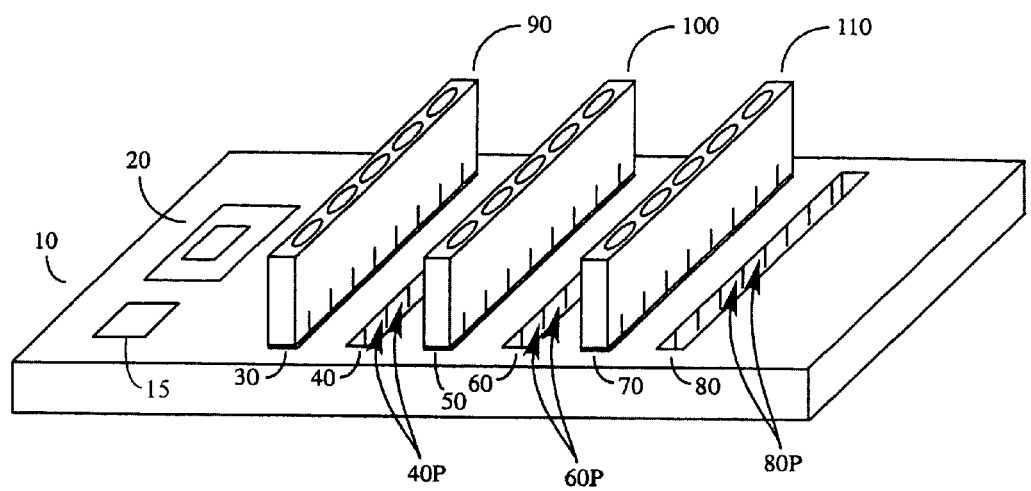
FIG. 1 is a perspective view of a motherboard of a system incorporating features of the present invention, along with a processor module and auxiliary component modules.

FIG. 1 shows a motherboard 10 of a system according to the invention, on which a processor module 20 is mounted. The motherboard 10 includes connector slots 30–80, which are of uniform design. That is, the numbers, positioning and configurations of connector pins (some of which are designated as 40P, 60P and 80P) associated with the slots 30–80 are essentially identical for the purposes of the present invention.

Expansion boards 90–110 are shown mounted in some of the expansion slots 30, 50 and 70, respectively, of the motherboard 10. For the purposes of this invention, it should be understood that "connector slot", "expansion slot" and similar designations of the connectors or slots in general refer to any connector arrangement for an expansion board for the system. Similarly, "expansion board" and alternative terms used herein refer to any circuit board, card or module that is used to provide some functionality, service or expanded capability to the system.

A variation may be had wherein some additional or fewer pins, or different placement of pins, is arranged for the slots 30–80, but for the common interface discussed herein at least a subset of the pins that connect with the uniform circuit boards should be the same. That subset of pins includes those necessary to enable the functions of the invention to be carried out, as described below.

In FIG. 1, the processor module 20 may be embodied as a single die, and carries on board and/or has associated with it on the motherboard 10 circuitry and/or logic as needed to implement the present invention. The computer system may further include a component control support logic 15 disposed on the motherboard 10 and configured to operate in conjunction with a component control module of the processor module 20.

For purposes of this invention, any logic or control circuits referred to may be implemented as electronic or semiconductor elements (e.g. processors, logic, ROMs, etc.), firmware or software, or some combination of these as appropriate for the application.

Figure 2:
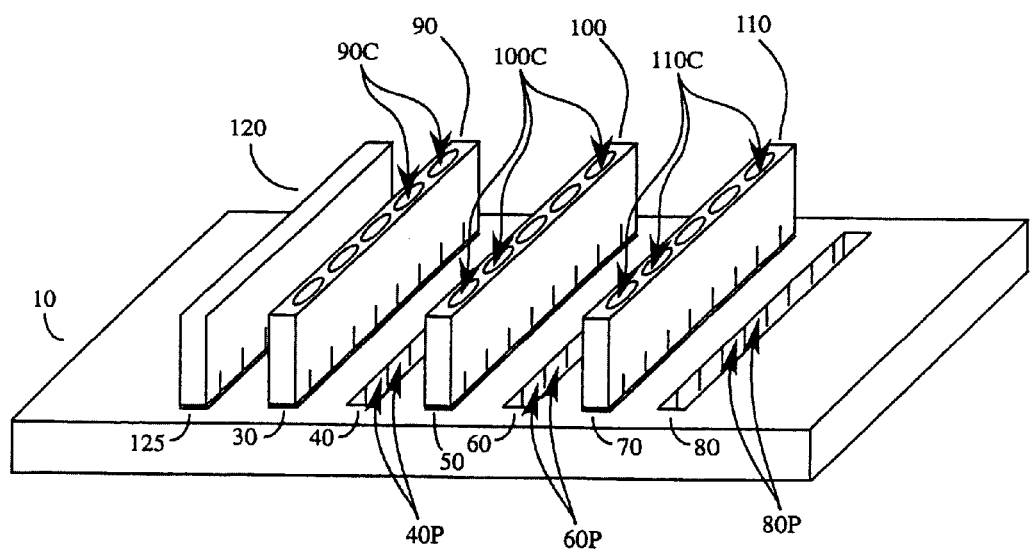
FIG. 2 is a perspective view of a motherboard of a system similar to that of FIG. 1, using an alternative processor module.

FIG. 2 shows an alternative arrangement for the motherboard 10 and other components of the embodiment shown in FIG. 1, wherein the processor module 120 is embodied as a plug-in daughter board for the motherboard 10, coupled via a connector edge to slot or socket 125. Similarly, daughter boards 90, 100 and 110 are shown plugged into sockets 30, 50 and 70, respectively. These boards 90–110 include connectors 90C, 100C and 110C, respectively, used in a manner to be described below. Sockets 30, 50, 70 and 125 in an embodiment of the invention are configured such that any one of these sockets can accommodate a plurality of different types of boards and provide the appropriate interconnections and functionality with the motherboard 10, and in particular they may be substantially identical sockets. Thus, in this example board 120 could be plugged into any of sockets 30, 50, 70 or 125, as could any of various types of boards 90–110.

Figure 3:
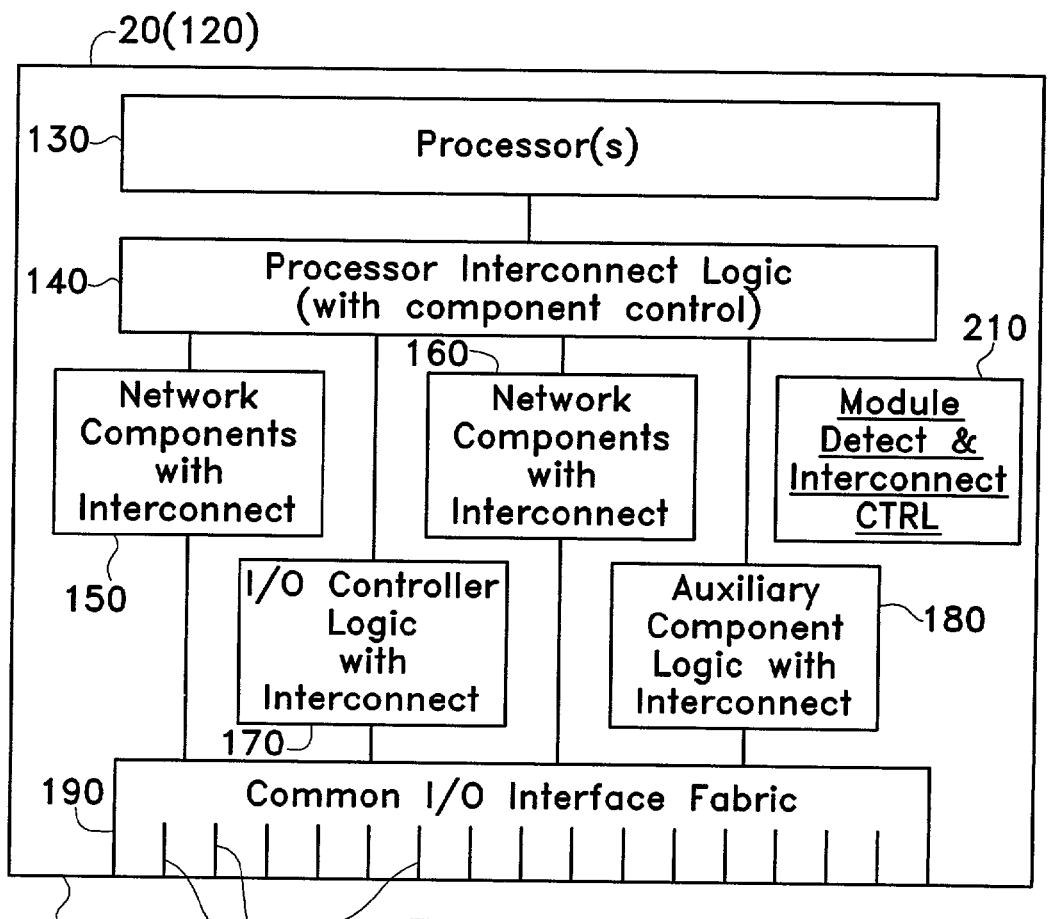
FIG. 3 is a block diagram of a processor module according to the embodiments of the invention shown in FIGS. 1 and 2.

FIG. 3 shows a circuit and logic suitable to implementing the features of the invention. FIG. 3 represents either chip (die) 20 or processor module 120, and includes all of the logic necessary to implement the invention. However, as indicated above, such logic may in part be on the motherboard, and/or portions or all of it may be implemented by forming it on a single die. The functionality will remain the same, though there will be design issues affecting speed, cost, complexity of manufacture, and so on that will inform the system designer's decision of which type of implementation to use. Thus, whether a processor chip 20 or module 120 is used, the components described below relative to FIG. 3 may be implemented.

Processor module 120 (or chip 20) includes one or more processors 130, coupled via processor interconnect logic 140 to various functional modules of the system. In the embodiment shown, these include network component logic 150, memory component logic 160, I/O controller logic 170, and auxiliary component logic 180, which may be logic for one or more additional types of functionality provided by an expansion board that is used with the system. The circuit elements on board the chip 20 or processor module 120 are coupled to appropriate connections on the motherboard 10, via a common I/O interface 190 and connection pins 200 disposed along edge 210. Alternatively, especially in the case of implementation on a chip 20, the connections may be disposed around two, three, or all four edges of the chip, to allow the chip to be surface-mounted on the motherboard.

All of the elements 140–410 operate under the control of and/or in cooperation with the processor(s) 130.

The processors, interconnects and logic shown in FIG. 3 may be implemented in a manner according to the applicant's invention disclosed in the patent application Ser. No. 10/099,716 entitled System Architecture Providing Redundant Components to Improve Die Yields and System Reliability by Kenneth Okin, filed on Mar. 12, 2002 which is incorporated herein by reference.

The operation of a system using one or more motherboards 10 in accordance with the invention is discussed below, after the following description of the physical configuration of such a system.

Physical Arrangement of the Standardized Design

Figure 4:
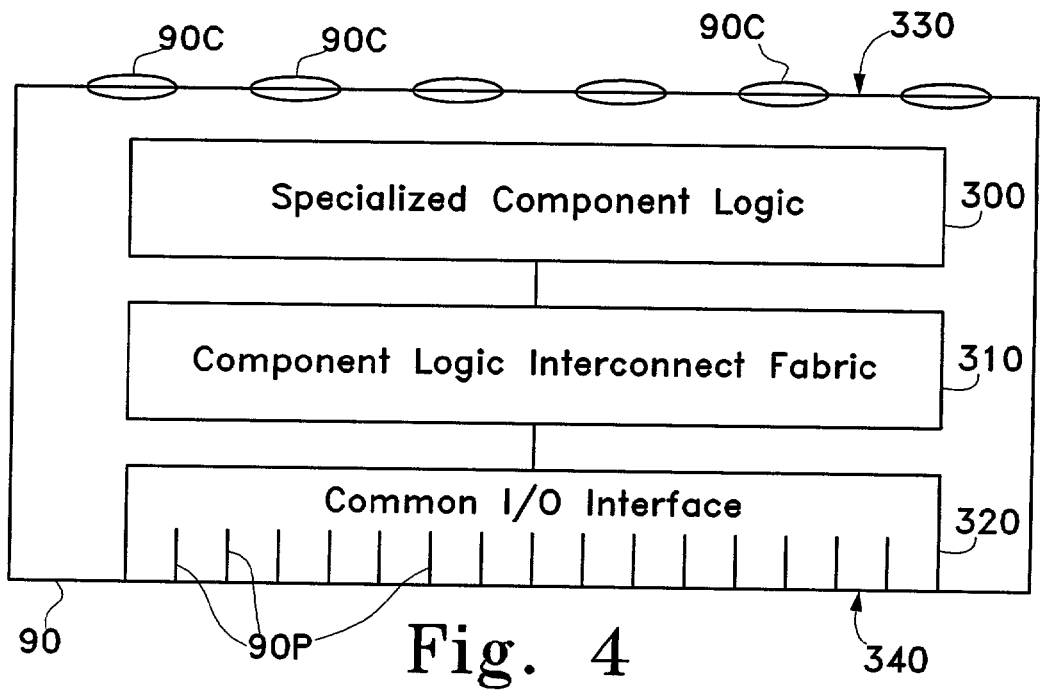
FIG. 4 is a block diagram of a standardized interface component module in accordance with the invention.

FIG. 4 is a block diagram showing the basic components of an expansion board, such as expansion board 90, to implement the present invention. Specialized component logic 300 is included, which may be whatever logic is appropriate for implementing the functions provided by the expansion board. For instance, if the board is an Ethernet adapter, then the appropriate Ethernet circuitry and protocols would be implemented by logic 300. If the board 90 is a memory module, then logic 300 would include the necessary RAM, drivers, buffers, etc. needed by the module. Other possibilities for expansion boards, as mentioned above, may include I/O functions, additional processing capability, etc.

The component logic 300 is coupled via an interconnect fabric 310 to a component I/O interface 320. The fabric 310 may include simple point-to-point connections, redundant back-up connections with redundant components as desired, or a more complex interconnection between a set of redundant components in the logic 300 which provide robust failover for one another. Such a system is described in the aforementioned patent application, System Architecture Providing Redundant Components to Improve Die Yields and System Reliability.

The expansion board 90 may include one or more auxiliary or supplemental connectors 90C, preferably positioned on an edge 330 opposite an edge 340 along which connection pins 90P are positioned. Pins 90P are configured to connect with at least some of the pins of one of the connector sockets, such as pins 30P (not separately shown), 40P, etc., of the sockets or slots 30–80 shown in FIGS. 1 and 2.

Figure 5:
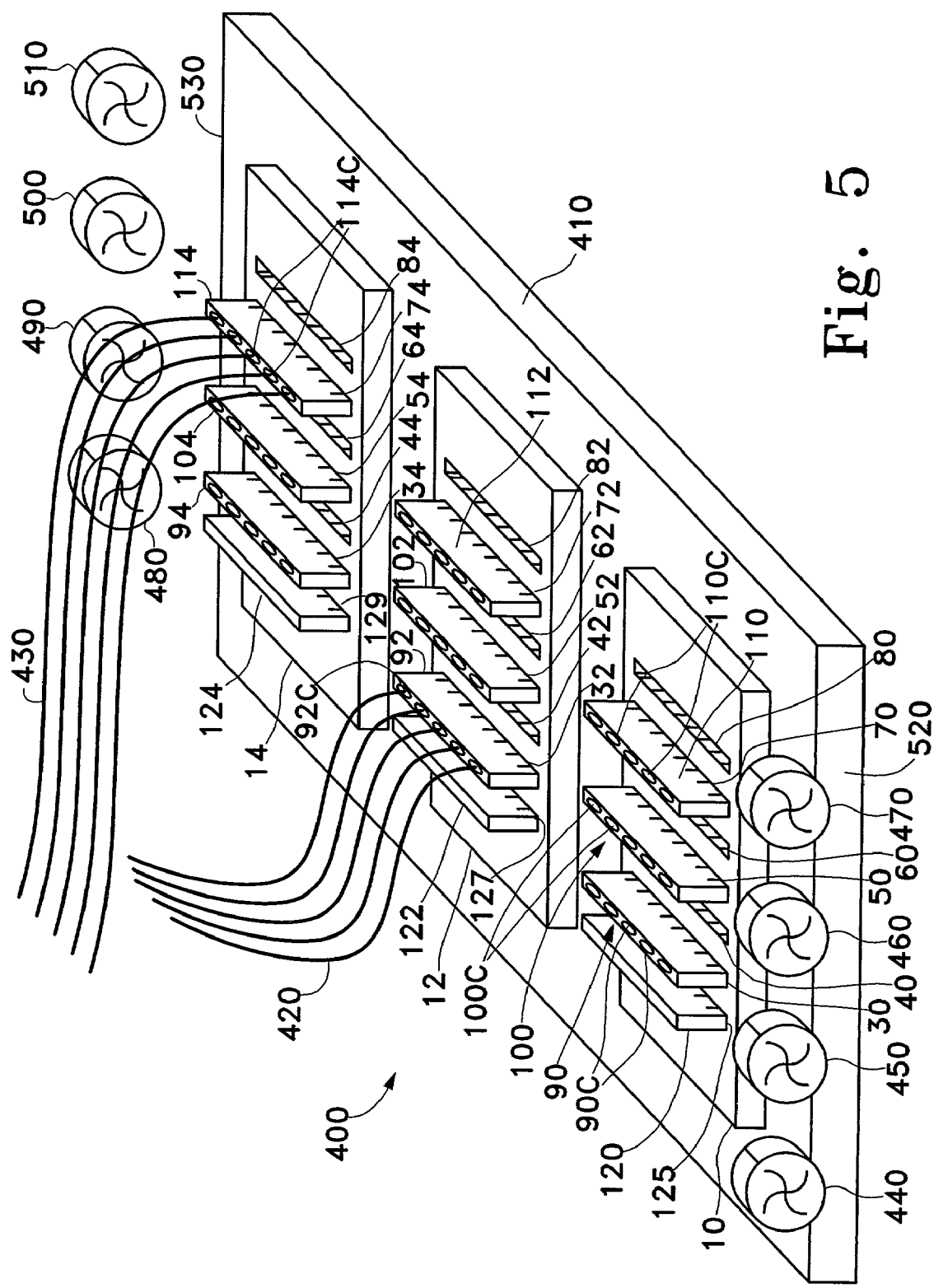
FIG. 5 is a perspective view of a multiboard system according to the invention.

FIG. 5 is a perspective view of a system 400 with a centerplane 410 to which processor boards (or motherboards) 10, 12 and 14 are connected. Processor board 10 is as described above with respect to FIG. 1 or 2, and processor boards 12 and 14 are of similar design. Thus, board 12 includes a processor chip or module 122, which may as described above with respect to module 120, as shown in FIG. 3, or may be of some alternative processor design, including carrying a different type of processor using a different operating system or architecture. The board 12 also includes connector slots 32–82 (i.e. 32, 42, 52, 62, 72 and 82), like connector slots 30–80 described above. These slots may be empty, if no expansion boards are used, or they maybe partially or fully populated by expansion boards. In the example shown in FIG. 5, three expansion boards 92, 102 and 112 are used.

The term "centerplane" as used herein may in some systems appropriately refer to the motherboard of such systems, in which case the motherboards 120–124 are effectively daughter boards to the "motherboard" centerplane. This is because terminology differs among various manufacturers, and among workstations, servers, and other process-based systems in which the present invention may be implemented, and in particular because, as systems get more complex, the centerplane or backplane serves functions previously served by motherboards. Thus, while the hierarchical nature of the architecture is describe with boards 120, 90–110, etc., plugging into boards 10, etc., which in turn plug into the centerplane (or system controller board, or system motherboard) 400, the specific terms assigned the components may vary.

Similarly, board 14 includes a processor module 124 (which, again, may be of similar or alternative design relative to processor modules 120 and 122) and connector slots 34–84, partially populated by expansion boards 94, 104 and 114 in slots 34, 54 and 74, respectively.

Conventional processor boards may also be included in the system 400, and fewer or more boards according to the invention such as boards 10, 12 and 14 may be used. As discussed above, the expansion boards may have a variety of functions, and accordingly some of them will use additional connectors such as connectors 92C of expansion board 92 and connectors 114C of expansion board 114. Connectors for the other expansion boards in FIG. 5 are shown, but it should be understood that some expansion boards (such as most memory modules) will neither need nor have such additional connectors.

These additional connectors 90C, 92C, 114C and so on are used to provide data transfer or other functionality between the system 400 and some other component, system, server, etc. For instance, expansion board 92 may be a network interface card, and multiple individual connecting cables 420 (five cables being shown by way of example) may be plugged into connectors 92C. Alternatively, the connecting cables 420 may take the form of a connector ribbon, e.g. to connect to a disk drive.

Similarly, expansion board 114 is provided with connecting cable or cables 430 for coupling to some other component, system, etc. working in cooperation with the system 400.

Several advantages result from the physical layout of the new standardized physical architecture, with connectors along one edge of the expansion boards 90–110, 92–112 and 94–114, and with supplemental connectors 90C, 92C, 114C, etc. along an opposite edge. One of these is that the supplemental connectors and any attached cables are not generally positioned at the level of the expansion boards, but rather are for the most part above the boards, thus providing a substantially unimpeded air passage for ventilation, which can be assisted by fans 440–470 (near front side 520 of the centerplane 410) and 480–510 (near back side 530 of centerplane 400). In many prior systems, connectors are positioned along a vertical edge of the expansion boards, or along some edge or surface other than the one opposite the connector edge to the motherboard, such that ventilation is impeded. The present system solves that problem.

Thus, the positioning of the supplemental connectors as shown defines a airflow paths extending from front side 520 to back side 530, below the connectors 90C, 100C, etc. and above the motherboard, which is substantially unimpeded by cables and therefore allows efficient cooling of the system, including the expansion cards, by the fans or other ventilation subsystem.

Figure 6:
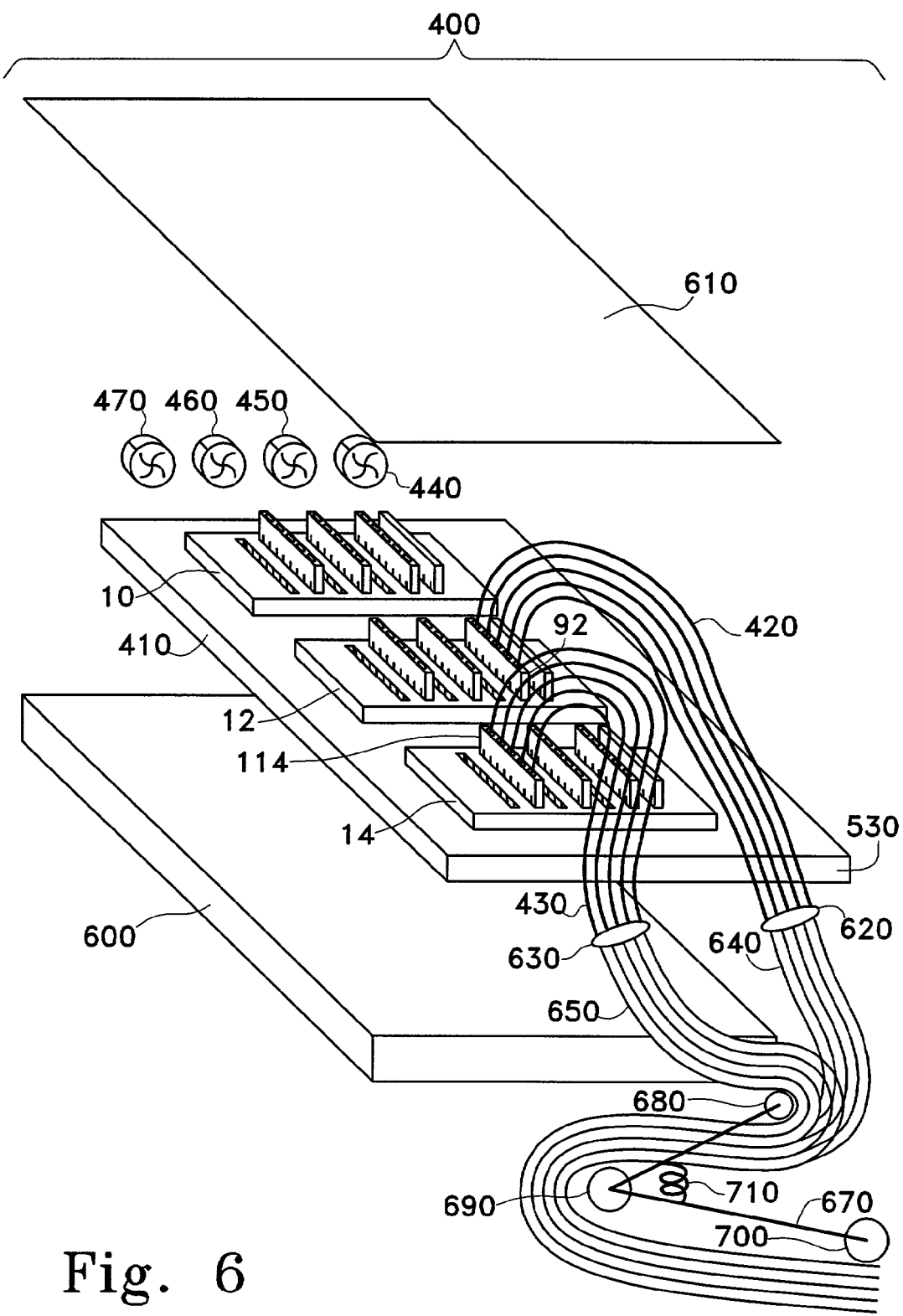
FIG. 6 is a perspective view of the multiboard system of FIG. 5, showing a suitable housing and cabling configuration.

In addition, the arrangement of the expansion board connectors along the edges away from the motherboard, preferably along the top edges of the expansion boards, greatly simplifies configuration and cabling of the system. As shown in FIG. 6, which is an exploded, reverse perspective view of the system shown in FIG. 5 (i.e. viewing from the back side 530 of the centerplane 400), all of the connector cables 420, 430, etc. can be routed out the back of the apparatus. The centerplane can be carried in a housing 600 in a conventional manner, and an EMI shield or other physically protective cover 610 is preferably installed.

Thus, cables 420 and 430 are routed to cables guides 620 and 630, respectively. These cable guides 620 and 630 may include coupling connectors, and thus further connect to cables or ribbons 640 and 650, respectively, as needed. A suitable arrangement, as shown in FIG. 6, is to provide an articulated cable routing support, including arms 660 and 670 (and others as may be useful), hinged to one another and carrying cable pulleys 680, 690 and 700, which roll or at least allow the cables to easily slide over them.

With this arrangement, as the centerplane 400 is pulled out (e.g. by sliding it out of a conventional server rack) for installation of cables, the articulated arm structure allows the cables to extend outwards. Cover 610 is lifted, and the user is presented with an array of very accessible expansion board connectors.

When appropriate connections have been made or altered, the centerplane is pushed back in, and the arms 660 and 670 retract, folding the cables up into a tighter space. The retraction can be accomplished by the use of one or more springs such as spring 710 connected to the arms 660 and 670, or by an electromechanical mechanism, or by other suitable mechanisms.

Operation of a System Using the Uniform Interface

Since the connector slots 30–80 (see FIGS. 5–6), etc. are of uniform design, any type of expansion board that the system 400 is designed to accommodate can be plugged into to any of the slots on the centerplane(s). The component logic 300 (see FIG. 4) carries information identifying the expansion board and its function, which is communicated to a processor 130 upon hot-plugging the expansion board into a centerplane. To this end, the module detect logic 210 of the processor chip 20 or module 120 is configured to poll the connector slots 30–80 (in the case of board 10), either at start-up, upon hot-plugging of an expansion board, or at some other system- or user-determined time.

Certain pins of the connector slots 30–80 and of the expansion board 90 can be dedicated to the polling and identification procedures.

The expansion board can be identified in a number of different manners, or some combination thereof. For instance, it may carry an identification number that is used by the processor module to identify it, e.g. by way of a look-up table. In addition, it may have a certain pattern of pins the are driven, and by the pattern the processor module can determine what type of expansion card it is. Alternatively, the processor module may perform a predefined diagnostic operation to determine the type of functionality provided by the expansion board, which may in fact include more than one type of functionality (e.g. memory expansion plus coprocessor functions), as desired. Using this last approach, expansion cards that were not defined at the time the system was built can be accommodated.

Once the expansion board has been identified, the module detect logic 210 informs the processor control logic 140, which then engages the appropriate control logic 150–180. Thus, if expansion board 90 is a network adapter card, then processor control logic 140 instructs the network component logic 150 to drive the appropriate pins and use the applicable network protocols to communicate with expansion board 90 in an appropriate manner for network communications. The same is applicable to any type of expansion board that may be plugged into the system. Thus, the I/O interface is dynamically reconfigured to a particularized configuration for the expansion board that is connected to the system. The number of types of such expansion boards that can be accommodated is very large—far larger than the number of types of expansion boards presently in use— due to the large number of combinations that can be made for a set of N connectors, where N is practically limited only by the physical layout of the processor module. For today's modules, N is typically many hundreds (e.g. 1368 for Sun Microsystems, Inc.'s UltraSPARC III modules), allowing for an extremely large number of possible pin-out combinations.

When a hot-plugged expansion board is used, the module detect and interconnect control logic 210 provides its resources to the processor module or processor 130 substantially without interruption of any pending processes, i.e. in a dynamic, real-time manner, without rebooting the system or halting threads that may be in progress. Interrupts may, of course, be used, as needed, but no power-down of the system will be needed.

The protocols to be used for a given expansion board are determined by that board's identification. Thus, a network card might be an Ethernet card, a USB card, etc. The appropriate protocols are preferably prestored on the chip 20 or module 120 at the time of production of the system, such as in a ROM or other memory associated with the component logic 150, 160, 170 or 180, or otherwise available to the chip 20 or module 120. However, the protocols may be updated in real time by providing additional information to the chip 20 or module 120, such as software driver updates, stored either locally or in a hard disk file that is accessed upon boot up.

A built-in self test (BIST) or other appropriate start-up routine can be configured both to poll the connector slots to determine the number and nature of the expansion boards present, and to determine whether the any software patches or updates should be loaded (or downloaded from an appropriate Web site). All necessary program or driver information (even if it's simply the information of the Web site storing the appropriate driver or update information) may be stored in the component logic 300 of the expansion board, or in the system itself, or some combination thereof. Such updating and downloading routines can also be carried out dynamically upon hot-plugging of an expansion board, or at other times.

It will be appreciated from the foregoing that the manufacture of a system incorporating the features of the invention is greatly simplified. Only one type of connector slot need be provided, with intelligence at the processor level (cooperating with the expansion boards) taking care of any differences in pinouts and protocols that may be specific to a given expansion board. Thus, a trade-off need not be made of, e.g., memory expansion capability vs. network capability at the time of production; rather, the user determines this when the system is set up, and in fact the balance drawn may be changed at any time. As many slots as desired may be included on the centerplane, motherboard or system controller board, and their uniformity allows for multiprocessor systems with greatly variable memory configurations and expansion card configurations.

Not only can a variety of standard types of expansion boards be accommodated by such a system, but expansion boards that have not even been developed at the time of manufacture of the system can be accommodated. To accomplish this, a new type of expansion board should include on-board either the drivers or protocols necessary for the system to use it, and/or Internet information sufficient to allow the system of the invention to download the necessary drivers. This can be done in a hot-pluggable, dynamic fashion, without any intervention by the user.

What is claimed is:

1. A computer system, including:
   a motherboard;
   a plurality of connector slots connected to the motherboard and having respective sets of connector pins, at least a subset of the connector pins substantially identically configured to connect with a plurality of types expansion boards for the system;
   a processor module including at least one processor, a plurality of component logic modules, an I/O interface configured to communicate with the motherboard, and component control module logic configured to identify the different types of expansion boards, wherein the different types of expansion boards include at least a network card, a memory module and a processor board, and to dynamically configure the I/O interface in accordance with such identification; and
   at least one such expansion board connected to one of the connector slots, the expansion board including at least one supplemental connector positioned along a first edge of the expansion board opposite a second edge of the expansion board which is positioned adjacent the motherboard.

2. The system of claim 1, wherein the position of the supplemental connector defines an airflow path substantially free of cables, and further including at least one system ventilator positioned to generate airflow through the path.

3. A processor module configured to operate in conjunction with a processor-based system having a plurality of substantially uniform expansion board connectors configured to receive different types of expansion boards, wherein the different types of expansion boards include at least a network card, a memory module and a processor board, including:
   at least one processor;
   an I/O interface configured to communicate with the processor-based system; and
   a component control module configured to identify a function type for an expansion board coupled to one of the expansion board connectors, and to dynamically configure the I/O interface to accommodate the identified function type.

4. The processor module of claim 3, further including logic configured to accommodate hot-plugging of the expansion boards, wherein the component control logic includes logic configured to identify a hot-plugged expansion board and provide resources thereof via the I/O interface to the processor module substantially without interruption of pending operations.

5. The computer system of claim 3, wherein the component control module is further configured to receive from an expansion board information relating to a location where program information for that expansion board can be retrieved, and to retrieve the program information from that location.

6. A method for dynamically configuring an I/O interface between a processor module and a motherboard of a computer system, including:
   configuring the I/O interface in a standardized manner to accommodate a plurality of different types of expansion boards for the system;
   identifying the type of an expansion board that is connected to the motherboard; and
   configuring the I/O interface in a particularized manner to communicate with the connected expansion board, wherein configuring the I/O interface in a standardized manner includes configuring the I/O interface to accommodate at least a network card, a memory module and a processor board.

7. The method of claim 6, wherein identification is carried out for a hotplugged expansion board in a real-time fashion, substantially without interruption to pending operations of the processor module.

8. The method of claim 6, further including:
   determining from a connected expansion board a location for information useful to provide functions of the connected expansion board to the system; and
   retrieving the information from the location.

9. The method of claim 6, further including:
   connecting at least one expansion card having auxiliary connectors in a position such that the auxiliary connectors are disposed along a first edge of the expansion card opposite a second edge of the expansion card adjacent a motherboard of the system, thereby defining an airflow path between the first and second edges.

10. The method of claim 9, further including ventilating the system at least in part via the defined airflow path.

* * * * *